United States Patent
Becker et al.

(10) Patent No.: US 9,640,376 B1
(45) Date of Patent: May 2, 2017

(54) INTERACTIVE ANALYSIS OF MASS SPECTROMETRY DATA

(71) Applicant: Protein Metrics Inc., San Carlos, CA (US)

(72) Inventors: Christopher Becker, San Carlos, CA (US); Marshall Bern, San Carlos, CA (US); Yong Joo Kil, San Carlos, CA (US); Michael Taejong Kim, South San Francisco, CA (US); Boyan Zhang, Foster City, CA (US)

(73) Assignee: Protein Metrics Inc., San Carlos, CA (US)

( * ) Notice: Subject to any disclaimer, the term of this patent is extended or adjusted under 35 U.S.C. 154(b) by 141 days.

(21) Appl. No.: 14/306,020

(22) Filed: Jun. 16, 2014

(51) Int. Cl.
*H01J 49/00* (2006.01)
*G06T 11/20* (2006.01)
*H01J 49/02* (2006.01)

(52) U.S. Cl.
CPC ........ *H01J 49/0036* (2013.01); *G06T 11/206* (2013.01); *H01J 49/02* (2013.01)

(58) Field of Classification Search
None
See application file for complete search history.

(56) References Cited

U.S. PATENT DOCUMENTS

| | | | |
|---|---|---|---|
| 4,464,650 A | 8/1984 | Eastman et al. |
| 4,558,302 A | 12/1985 | Welch |
| 4,814,764 A | 3/1989 | Middleton |
| 5,343,554 A | 8/1994 | Koza et al. |
| 5,995,989 A | 11/1999 | Gedcke et al. |
| 6,094,627 A | 7/2000 | Peck et al. |
| 6,393,393 B1 | 5/2002 | Kawahara |
| 6,535,555 B1 | 3/2003 | Bordes et al. |
| 6,798,360 B1 | 9/2004 | Qian et al. |
| 6,906,320 B2 | 6/2005 | Sachs et al. |
| 7,006,567 B2 | 2/2006 | Frossard et al. |
| 7,283,684 B1 | 10/2007 | Keenan |
| 7,283,937 B2 | 10/2007 | Goldberg |
| 7,297,940 B2 | 11/2007 | Bern |
| 7,400,772 B1 | 7/2008 | Keenan |
| 7,402,438 B2 | 7/2008 | Goldberg |
| 7,429,727 B2 | 9/2008 | Bern |
| 7,496,453 B2 | 2/2009 | Chau |
| 7,680,670 B2 | 3/2010 | Lamblin et al. |

(Continued)

FOREIGN PATENT DOCUMENTS

| WO | 2011/127544 A1 | 10/2011 |
| WO | WO 2011/127544 A1 | 10/2011 |

OTHER PUBLICATIONS

Thermo Fisher Scientific, Inc.; Thermo Xcaliber: Qualitative Analysis (User Guide); Revision B; 290 pgs.; Sep. 2010.

(Continued)

*Primary Examiner* — Vu Nguyen
(74) *Attorney, Agent, or Firm* — Shay Glenn LLP

(57) ABSTRACT

This invention relates to graphical user-interactive displays for use in MS-based analysis of protein impurities, as well as methods and software for generating and using such. One aspect provides a user-interactive display comprising an extracted mass chromatogram (XIC), an MS1 spectrum and an MS2 spectrum, all simultaneously representing a user-selected peptide. Another aspect provides a user interactive display simultaneously presenting paired spectra (XIC, MS1 and/or MS2) for a variant peptide and its corresponding wildtype counterpart.

20 Claims, 9 Drawing Sheets

(56) References Cited

U.S. PATENT DOCUMENTS

Figure 1:
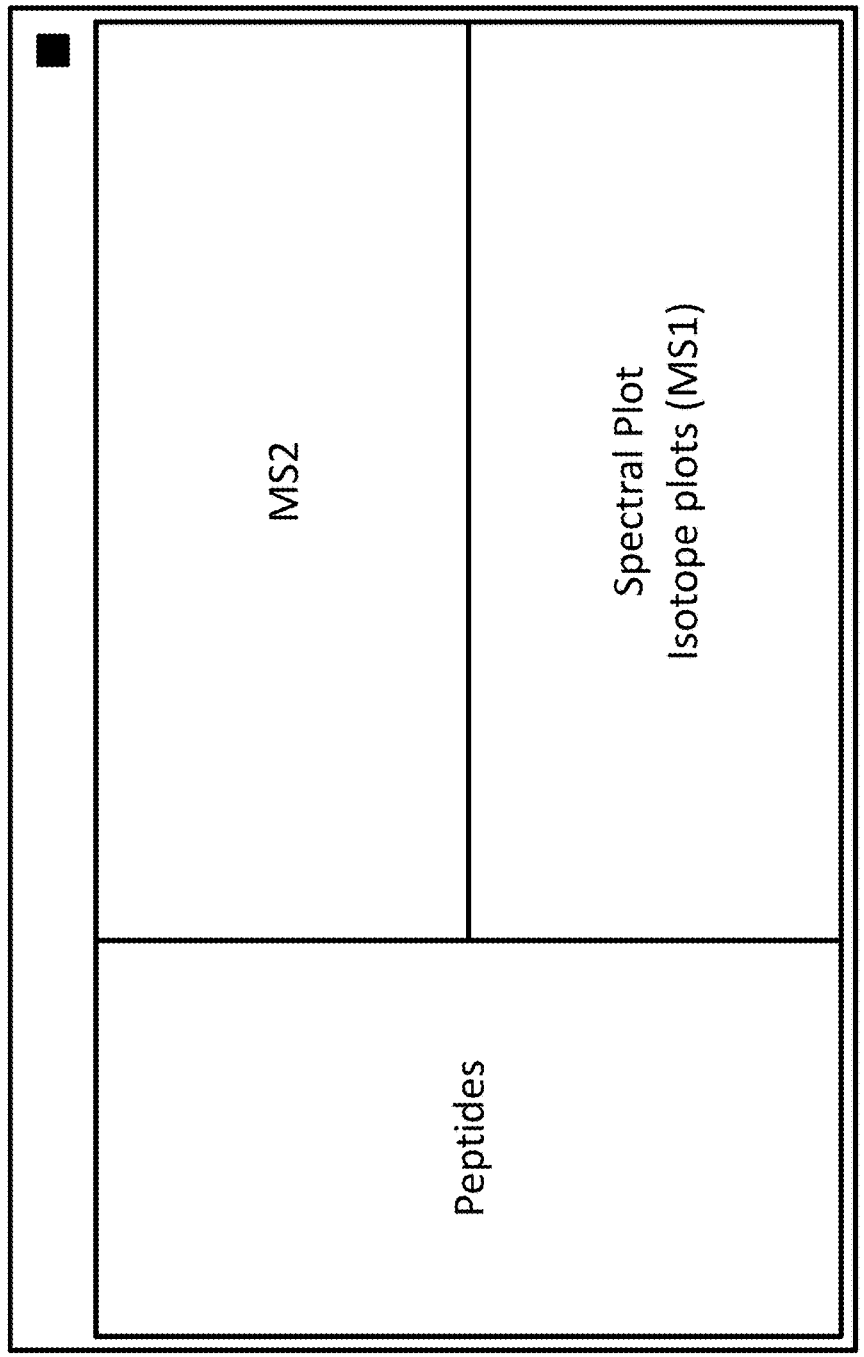

| | | |
|---|---|---|
| 7,979,258 B2 | 7/2011 | Goldberg et al. |
| 8,004,432 B2 | 8/2011 | Kawato |
| 8,077,988 B2 | 12/2011 | Donoho |
| 8,108,153 B2 | 1/2012 | Bern |
| 8,428,889 B2 | 4/2013 | Wright |
| 8,511,140 B2 | 8/2013 | Gorenstein et al. |
| 8,598,516 B2 | 12/2013 | Sapargaliyev et al. |
| 8,645,145 B2 | 2/2014 | Subbaraman et al. |
| 2002/0068366 A1 | 6/2002 | LaDine et al. |
| 2003/0031369 A1 | 2/2003 | Le Pennec et al. |
| 2004/0102906 A1 | 5/2004 | Roder |
| 2004/0160353 A1 | 8/2004 | Cirillo et al. |
| 2005/0047670 A1 | 3/2005 | Qian et al. |
| 2008/0010309 A1 | 1/2008 | Sugita |
| 2008/0260269 A1 | 10/2008 | Thiagarajan |
| 2010/0124785 A1 | 5/2010 | Bern |
| 2010/0288917 A1 | 11/2010 | Satulovsky et al. |
| 2010/0288918 A1 | 11/2010 | Satulovsky |
| 2011/0093205 A1 | 4/2011 | Bern |
| 2012/0245857 A1 | 9/2012 | Lee et al. |
| 2013/0080073 A1 | 3/2013 | de Corral |
| 2013/0144540 A1 | 6/2013 | Bern et al. |
| 2013/0226594 A1 | 8/2013 | Fuchs et al. |
| 2013/0262809 A1 | 10/2013 | Wegener |
| 2013/0275399 A1 | 10/2013 | Amit et al. |
| 2013/0289892 A1 | 10/2013 | Satoh |
| 2014/0045273 A1 | 2/2014 | Cerda et al. |
| 2014/0164444 A1 | 6/2014 | Bowen et al. |
| 2015/0319268 A1 | 11/2015 | Callard et al. |
| 2016/0267220 A1 | 9/2016 | Becker et al. |

OTHER PUBLICATIONS

VanBramer; An Introduction to Mass Spectrometry; Wider University; 38 pgs.; ©1997; (revised) Sep. 2, 1998.

Yang et al.; Detecting low level sequence variants in recombinant monoclonal antibodies; mAbs 2 (3); pp. 285-298; May/Jun. 2010.

Ziv et al.; A universal algorithm for sequential data compression; IEEE Trans. on Information Theory; IT-23(3); pp. 337-343; May 1977.

Ziv et al.; Compression of individual sequences via variable-rate coding; IEEE Trans. on Information Theory; IT-24(5); pp. 530-536; Sep. 1978.

Kletter, Doran; U.S. Appl. No. 14/877,875 entitled "Enhanced Data Compression for Sparse Multidimensional Ordered Series Data," filed Oct. 7, 2015.

Schreiber and Cox "Using PeakView(TM) Software with the XIC Manager for Screening and Identification with High Confidence based on High Resolution and Accurate Mass LC-MS/MS" AB Sciex: Food & Environmental. Publication No. 2170811-03. (c) 2011.

Valot, et al. "MassChroQ : A versatile tool for mass spectrometry quantification" Proteomics. 2011. vol. 11 No. 17, pp. 3572-3577. (Epub Aug. 4, 2011).

Kletter; U.S. Appl. No. 15/200,494 entitled "Enhanced data compression for sparse multidimensional ordered series data," filed Jul. 1, 2016.

FIG. 6

INTERACTIVE ANALYSIS OF MASS SPECTROMETRY DATA

I. GOVERNMENT LICENSE RIGHTS

This application was made with government support under grant number R43 GM100634 awarded by the National Institutes of Health. The government has certain rights in the invention.

II. FIELD

This invention relates to graphical user-interactive displays for use in MS-based analysis of protein impurities, as well as methods and software for generating and using such.

III. INTRODUCTION

Due to the complexity of proteins and their biological production, characterization of protein pharmaceuticals ("biologics") poses much more demanding analytical challenges than do small molecule drugs. Biologics are prone to production problems such as sequence variation, misfolding, variant glycosylation, and post-production degradation including aggregation and modifications such as oxidation and deamidation. These problems can lead to loss of safety and efficacy, so the biopharmaceutical industry would like to identify and quantify variant and degraded forms of the product down to low concentrations, plus obtain tertiary structure information. Because of the rapidly increasing power of mass spectrometry (MS), an MS-based platform for comprehensive measurement of almost all the relevant drug's physical characteristics is now conceivable. A crucial piece of such a platform is data analysis software focused to address the needs of the biopharmaceutical industry.

At every stage in the development and manufacture of a protein pharmaceutical, there is a need to characterize recombinantly produced protein molecules. This need arises in new product development, biosimilar (generic) product development, and in quality assurance for existing products. With the first generation of protein drugs just emerging from patent protection, and generic manufacturers rushing to enter the marketplace, assays and regulatory guidelines for biosimilarity have become a matter of some urgency. Over 30 branded biologics with worldwide sales >$50B will come off patent in 2011-2015, and the biosimilars markets is expected to grow to about $4B by 2015.

Quality assurance for monoclonal antibodies, as an example, must consider primary structure, higher order structure, glycosylation and heterogeneity. Primary structure analyses can include total mass (as measured by MS), amino acid sequence (as measured by orthogonal peptide mapping with high resolution MS and MS/MS sequencing), disulfide bridging (as measured by non-reducing peptide mapping), free cysteines (as measured by Ellman's or peptide mapping), and thioether bridging (as measured by peptide mapping, SDS-PAGE, or CGE). Higher order structure can be analyzed using CD spectroscopy, DSC, H-D-exchange, and FT-IR. Glycosylation requires identification of glycan isoforms (by NP-HPLC-ESI-MS, exoglycosidase digestion, and/or MALDI TOF/TOF), sialic acid (by NP-HPLC, WAX, HPAEC, RP-HPLC) and aglycolsylation (by CGE and peptide mapping). Heterogeneity analyses must take into consideration C- and N-terminal modifications, glycation of lysine, oxidation, deamidation, aggregation, disulfide bond shuffling, and amino acid substitutions, insertions and deletions. The large variety of assays and techniques gives some idea of the daunting analytical challenge. As early as 1994, Russell Middaugh of Merck Research Laboratories (Middaugh, 1994) called for a single comparative analysis in which "a number of critical parameters are essentially simultaneously determined". We believe that mass spectrometry (MS) now largely answers this call, because it can cover most of the physicochemical properties required for molecular analysis.

One of the problems with MS-based assays, however, is the lack of high-quality data analysis software. Unlike slow gel-based peptide mapping, which allows human visual comparison, MS generally relies on automatic data analysis, due to the huge numbers of spectra (often >10,000/hour), the high accuracy of the measurements (often in the 1-10 ppm range), and the complexity of spectra (100s of peaks spanning a dynamic range >1000). There are a large number of programs for "easy" MS-based proteomics, for example, SEQUEST, Mascot, X!Tandem, etc., but these programs were not designed for deep analysis of single proteins, and are incapable of difficult analytical tasks such as characterizing mutations, glycopeptides, or metabolically altered peptides. Moreover, the programs just named are all identification tools and must be coupled with other programs such as Rosetta Elucidator (now discontinued), Scaffold, or Thermo Sieve for differential quantification. There are also specialized tools such as PEAKS for de novo sequencing, along with a host of academic tools. The confusing array of software tools poses an obstacle to biotech companies adopting MS-based assays.

The methods and systems described herein free up the time of technical staff for additional projects while reducing staff frustration with the analysis process. Prior to the present methods and systems, sequence variant analysis (SVA) used a cumbersome combination of several existing software tools, supplemented with the use of spreadsheet macros. In contrast, described herein is an integrated approach providing a single user-friendly dashboard where one can identify false positives and quantify true positives efficiently. This gives greater confidence to the user and drastically reduces the time required to distinguish true from false positive identifications. Drug substance analyses are generally on the critical path of development, and projects are often gated by the analysis of a production run. Any time saving that leads to earlier commercialization of a drug brings significant monetary benefits to the company, not to mention the therapeutic benefits of bringing novel treatments to the patients as early as possible.

IV. SUMMARY OF THE INVENTION

This invention relates to graphical user-interactive displays for use in MS-based analysis of protein impurities, as well as methods and software for generating and using such. One aspect provides a user-interactive display comprising an extracted mass chromatogram (XIC), an MS1 spectrum and an MS2 spectrum, all simultaneously representing a user-selected peptide. Another aspect provides a user interactive display simultaneously presenting paired spectra (XIC, MS1 and/or MS2) for a variant peptide and its corresponding wildtype counterpart.

One aspect of the invention provides non-transitory machine-readable media that store instructions, which, when performed by a machine, cause the machine to perform operations comprising: (a) receiving a data file comprising mass spectrometry (MS) data for a sample comprising a mixture of molecules comprising a reference molecule and one or more variant molecules, wherein each variant molecule has a chemical modification relative to the reference molecule, and wherein the MS data comprises a plurality of spectral representations; (b) providing an assembly of molecular identifications, wherein each molecular identification correlates a spectral representation with the reference molecule and a modification state, wherein the modification state describes the chemical modification for a variant molecule relative to the reference molecule and wherein the modification state is null for the reference molecule; (c) selecting a molecular identification based on user-input; and (d) simultaneously displaying a first arrangement of a plurality of spectral representations, wherein a first spectral representation of the first arrangement is correlated to the selected molecular identification and a second spectral representation of the first arrangement is correlated to a first molecular identification having the same reference molecule but different modification state.

An additional aspect of the invention provides methods for displaying mass spectrometry data comprising: (a) receiving a data file comprising mass spectrometry (MS) data for a sample comprising a mixture of molecules comprising a reference molecule and one or more variant molecules, wherein each variant molecule has a chemical modification relative to the reference molecule, and wherein the MS data comprises a plurality of spectral representations; (b) providing an assembly of molecular identifications, wherein each molecular identification correlates a spectral representation with the reference molecule and a modification state, wherein the modification state describes the chemical modification for a variant molecule relative to the reference molecule and wherein the modification state is null for the reference molecule; (c) selecting a molecular identification based on user-input; and (d) simultaneously displaying a first arrangement of a plurality of spectral representations, wherein a first spectral representation of the first arrangement is correlated to the selected molecular identification and a second spectral representation of the first arrangement is correlated to a first molecular identification having the same reference molecule but different modification state.

The reference molecule preferably is a molecule selected from the group consisting of polypeptides, oligonucleotides, lipids, organic polymers, pharmaceutical excipients and growth media components. In a preferred implementation, the sample comprises a protein or protein mixture subjected to digestion by a proteolytic enzyme and the reference molecule is a peptide.

In some implementations, the assembly of molecular identifications is presented in tabular form, wherein each line of the tabular form represents the reference molecule or a single variant molecule, and wherein the step of selecting a molecular identification comprises selecting a line of the tabular form. The assembly of molecular identifications can be populated from results of a computational search of observed spectra with respect to a database or library of recorded spectra. The tabular form can comprises a variety of fields, for example, a field providing the modification state of each peptide or a field providing a validation status of each molecular identification. Examples of suitable modification state include, but are not limited to, modification state is selected from the group consisting of unmodified, sequence variant, insertion, deletion, extension, oxidation, deamidation, conjugate, glycation, sulfation, and glycosylation. Examples of suitable validation statuses include, but are not limited to true-positive, false-positive and uncertain.

In some implementations, where the reference molecule is a peptide, the assembly of molecular identifications is a graphical representation of the protein, wherein the graphical representation of the protein comprises an amino acid sequence for the protein and a plurality of markers mapped to the amino acid sequence and representing peptides within the protein, and further wherein the step of selecting a peptide comprises user selection of a marker. Preferably, prior to data acquisition, the protein is subjected to controlled digestion to generate the peptide mixture. Typically the peptide mixture is a product of digestion of the protein with a proteolytic enzyme, however other methods of controlled digestion are contemplated. The peptides can be designated as wildtype or variant. A variant peptide can be modified relative to the corresponding wildtype (reference) peptide by a single amino acid substitution, a double amino acid substitution, oxidation, deamidation, glycosylation, a single amino acid deletion or a single amino acid insertion.

Preferably, the first spectral representation and second spectral representation are selected from the group consisting of MS1 spectra, MS2 spectra and extracted ion chromatogram (XIC). In some implementations, the first spectral representation is displayed immediately adjacent (i.e. immediately above, immediately below or immediately beside) the second spectral representation. Alternatively, the first spectral representation and second spectral representation are displayed sharing a single horizontal axis. In some implementations, the arrangement will comprise a third spectral representation correlated to a second molecular identification having the same reference molecule as the selected and first molecular identifications but a different modification state from both the selected and first molecular identifications. The invention contemplates the inclusion of additional spectral representations in the arrangement, wherein the $n^{th}$ spectral presentation is correlated to a $(n-1)^{th}$ molecular identification, wherein every spectral representation in the arrangement is correlated to a molecular identification sharing the same reference molecule, but optionally varying in modification states.

In many implementations, the operation or method will further comprise the step of simultaneously displaying a second arrangement of a plurality of spectral representations, wherein a first spectral representation of the second arrangement is correlated to the selected molecular identification and a second spectral representation of the second arrangement is correlated to the first molecular identification. In a first implementation, the spectral representations of the first arrangement are MS1 spectra, and the spectral representations of the second arrangement are MS2 spectra. In a second implementation, the spectral representations of the first arrangement are MS1 spectra, and the spectral representations of the second arrangement are XIC. In a third implementation, the spectral representations of the first arrangement are MS2 spectra, and the spectral representations of the second arrangement are XIC.

One aspect of the invention provides non-transitory machine-readable media that store instructions, which, when performed by a machine, cause the machine to perform operations comprising: (a) receiving a data file comprising mass spectrometry (MS) data for a sample, comprising a plurality of molecules, preferably a mixture of peptides produced by enzymatic digestion of a protein, wherein the MS data comprise spectra collected across a time range for the sample prior to and after fragmentation; (b) displaying a layout of a plurality of views in a graphical user interface; and (c) controlling the layout of the plurality of views with an user-interactive selector, wherein a single user action selects a molecule and simultaneously updates the plurality of views to display the XIC, MS1 spectrum and MS2 spectrum associated with the selected molecule. The plurality of views comprises: (1) an extracted mass chromatogram (XIC) based on the data file showing a measure of input molecules as a function of time, the chromatogram comprising a plurality of XIC peaks, wherein each peak is associated with one or more molecules, each of which is associated with a plurality of MS1 and MS2 spectra; (2) an MS1 spectrum based on data collected for the sample prior to fragmentation, wherein the spectrum comprises a plurality of MS1 peaks, wherein one or more peaks are each associated with a corresponding MS2 spectrum; and (3) an MS2 spectrum based on data collected for the sample after fragmentation, wherein the spectrum corresponds to a peak in the displayed MS1.

Another aspect of the invention provides methods for displaying a plurality of user-interactive MS-based peptide identifications, the method comprising: (a) receiving a data file comprising mass spectrometry (MS) data for a sample, comprising a plurality of molecules, preferably a mixture of peptides produced by enzymatic digestion of a protein, wherein the MS data comprise spectra collected across a time range for the sample prior to and after fragmentation; (b) displaying a layout of a plurality of views in a graphical user interface; and (c) controlling the layout of the plurality of views with an user-interactive selector, wherein a single user action selects a molecule and simultaneously updates the plurality of views to display the XIC, MS1 spectrum and MS2 spectrum associated with the selected molecule. The plurality of views comprises: (1) an extracted mass chromatogram (XIC) based on the data file showing a measure of input molecule as a function of time, the chromatogram comprising a plurality of XIC peaks, wherein each peak is associated with one or more molecules, each of which is associated with a plurality of MS1 and MS2 spectra; (2) an MS1 spectrum based on data collected for the sample prior to fragmentation, wherein the spectrum comprises a plurality of MS1 peaks, wherein one or more peaks are each associated with a corresponding MS2 spectrum; and (3) an MS2 spectrum based on data collected for the sample after fragmentation, wherein the spectrum corresponds to a peak in the displayed MS1.

In some implementations, the user-interactive selector is a list of molecular identifications, preferably peptide indications, in tabular form, wherein each line of the tabular form represents a single molecule from the list, wherein user-selection of a molecule from the list automatically displays the XIC, MS1 spectrum and MS2 spectrum associated with the molecule. In many implementations, each molecular identification in the tabular form correlates a spectral representation (XIC, MS1 spectrum or MS2 spectrum) with a reference molecule and a modification state. Typically the modification state describes the chemical modification for a variant molecule relative to the reference molecule. The modification state would be null for the reference molecule Preferably the selected molecule is a peptide. Typically, the peptide is present in a peptide mixture that is a product of digestion of a protein with a proteolytic enzyme, however other methods of controlled digestion are contemplated. The list of peptide identifications can be populated from results of a computational search of observed spectra with respect to a sequence database or library of recorded spectra. In another implementation, the user-interactive selector is a graphical representation of the protein. For example, the graphical representation of the protein can comprise an amino acid sequence for the protein and a plurality of markers mapped to the amino acid sequence and representing peptides within the protein, and further wherein user selection of a marker automatically displays the XIC, MS1 spectrum and MS2 spectrum associated with the peptide represented by the marker. The peptide mapped to the amino acid sequence can be modified relative to the amino acid sequence, and the modification would be graphically depicted on the marker for the peptide. In yet another implementation, the user-interactive selector is an indicator for selecting an XIC peak.

In certain implementations, the data comprising MS data is collected by a tandem mass spectrometer. In other implementations, the MS data is collected as MS1 data prior to fragmentation on a first mass spectrometer and MS2 data after fragmentation on a second mass spectrometer.

In some implementations, the time range is generated in the context of a separation method applied to the sample. The separation method can be, but is not limited to any one of the group consisting of liquid chromatography (LC), gas chromatography, ion mobility, gel electrophoresis and capillary electrophoresis.

Yet another aspect of the invention provides non-transitory machine-readable media that store instructions, which, when performed by a machine, cause the machine to perform operations comprising: (a) receiving a data file comprising mass spectrometry (MS) data for a sample comprising a mixture a reference molecule and one or more variant molecules, wherein each variant molecule has a chemical modification relative to the reference molecule, and wherein the MS data comprises a plurality of spectral representations; (b) providing an assembly of molecular identifications, wherein each molecular identification correlates a plurality of spectral representations with the reference molecule and a modification state, wherein the plurality of spectral representations comprise an extracted ion chromatogram (XIC), an MS1 spectrum and an MS2 spectrum, and wherein the modification state describes the chemical modification for a variant molecule relative to the reference molecule and wherein the modification state is null for the reference molecule; (c) selecting a molecular identification based on user-input; and (d) displaying an arrangement of a plurality of views in a graphical user interface. The plurality of views comprises: (1) a first XIC correlated to the selected peptide immediately adjacent to a second XIC correlated to a first molecular identification having the same reference molecule as the selected peptide but different modification state; (2) a first MS1 correlated to the selected peptide immediately adjacent to a second MS1 correlated to a first molecular identification having the same reference molecule as the selected peptide but different modification state; and (3) a first MS2 correlated to the selected peptide immediately adjacent to a second MS2 correlated to a first molecular identification having the same reference molecule as the selected peptide but different modification state.

Another aspect of the invention provides methods for displaying mass spectrometry data, the method comprising: (a) receiving a data file comprising mass spectrometry (MS) data for a sample comprising a mixture a reference molecule and one or more variant molecules, wherein each variant molecule has a chemical modification relative to the reference molecule, and wherein the MS data comprises a plurality of spectral representations; (b) providing an assembly of molecular identifications, wherein each molecular identification correlates a plurality of spectral representations with the reference molecule and a modification state, wherein the plurality of spectral representations comprise an extracted ion chromatogram (XIC), an MS1 spectrum and an MS2 spectrum, and wherein the modification state describes the chemical modification for a variant molecule relative to the reference molecule and wherein the modification state is null for the reference molecule; (c) selecting a molecular identification based on user-input; and (d) displaying an arrangement of a plurality of views in a graphical user interface. The plurality of views comprises: (1) a first XIC correlated to the selected peptide immediately adjacent to a second XIC correlated to a first molecular identification having the same reference molecule as the selected peptide but different modification state; (2) a first MS1 correlated to the selected peptide immediately adjacent to a second MS1 correlated to a first molecular identification having the same reference molecule as the selected peptide but different modification state; and (3) a first MS2 correlated to the selected peptide immediately adjacent to a second MS2 correlated to a first molecular identification having the same reference molecule as the selected peptide but different modification state.

One aspect of the invention provides, non-transitory machine-readable media that store instructions, which, when performed by a machine, cause the machine to perform operations comprising: (a) receiving a data file comprising mass spectrometry (MS) data for a sample comprising a peptide mixture of a protein wherein the peptide mixture comprises wildtype peptide and variant peptide, and wherein the MS data comprise spectra collected across a time range for the sample prior to and after fragmentation; (b) providing an assembly of molecular identifications, wherein each peptide identification correlates a peptide with a peak in one or more spectral representations and further wherein each peptide identification categorizes the peptide as a wildtype peptide or a variant peptide, wherein a variant peptide corresponds to a wildtype peptide but is modified relative to that wildtype peptide; (c) selecting a peptide based on user-input; (d) identifying a matched peptide, wherein if the user-selected peptide is a variant peptide, then the matched peptide is the corresponding wildtype peptide, and if the user-selected peptide is a wildtype peptide, then the matched peptide is a corresponding variant peptide; and (e) displaying a layout of a plurality of views in a graphical user interface. The said plurality of views comprises: (1) a first extracted mass chromatogram (XIC) comprising a peak representing the selected peptide and a second XIC comprising a peak representing the matched peptide, wherein each XIC is based on the data file and displays a measure of peptide as a function of time; (2) a first MS1 spectrum comprising a peak representing the selected peptide and a second MS1 spectrum comprising a peak representing the matched peptide, wherein each MS1 spectrum is based on data collected for the sample prior to fragmentation; and (3) a first MS2 spectrum comprising a peak representing the selected peptide and a second MS2 spectrum comprising a peck corresponding to the match peptide, wherein each MS2 spectrum is based on data collected for the sample after fragmentation.

The software works by the user considering each putative identification of a variant/modification and using all the information interactively brought together by the program to determine if the identification is true or false (validation). The user makes this decision and may also make comments; the software also makes room for one or more reviewer to enter their response and comments. Results (tables and figures) may be exported for report generation and sharing with colleagues.

V. BRIEF DESCRIPTION OF THE DRAWINGS

Figure 2:
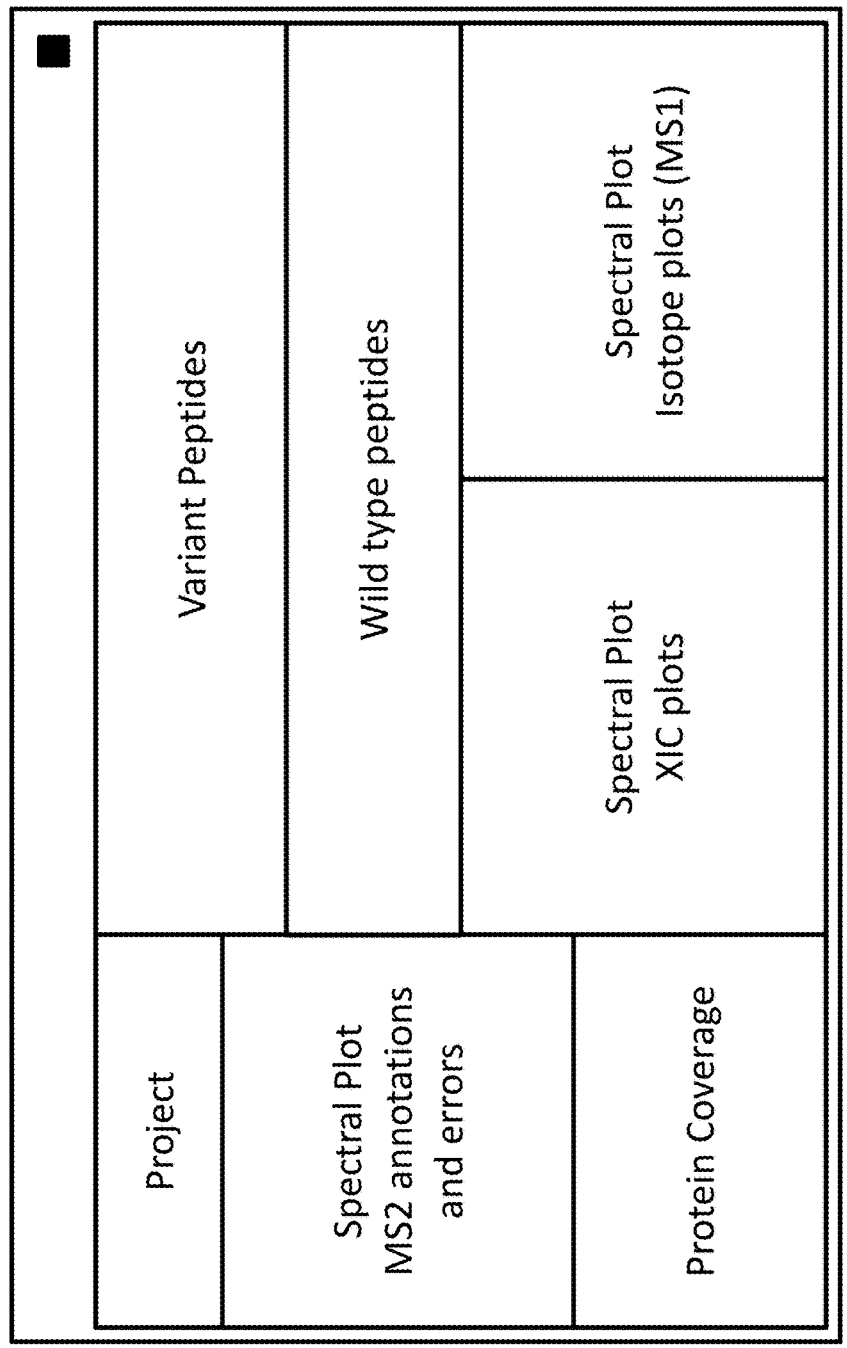
Figure 3:
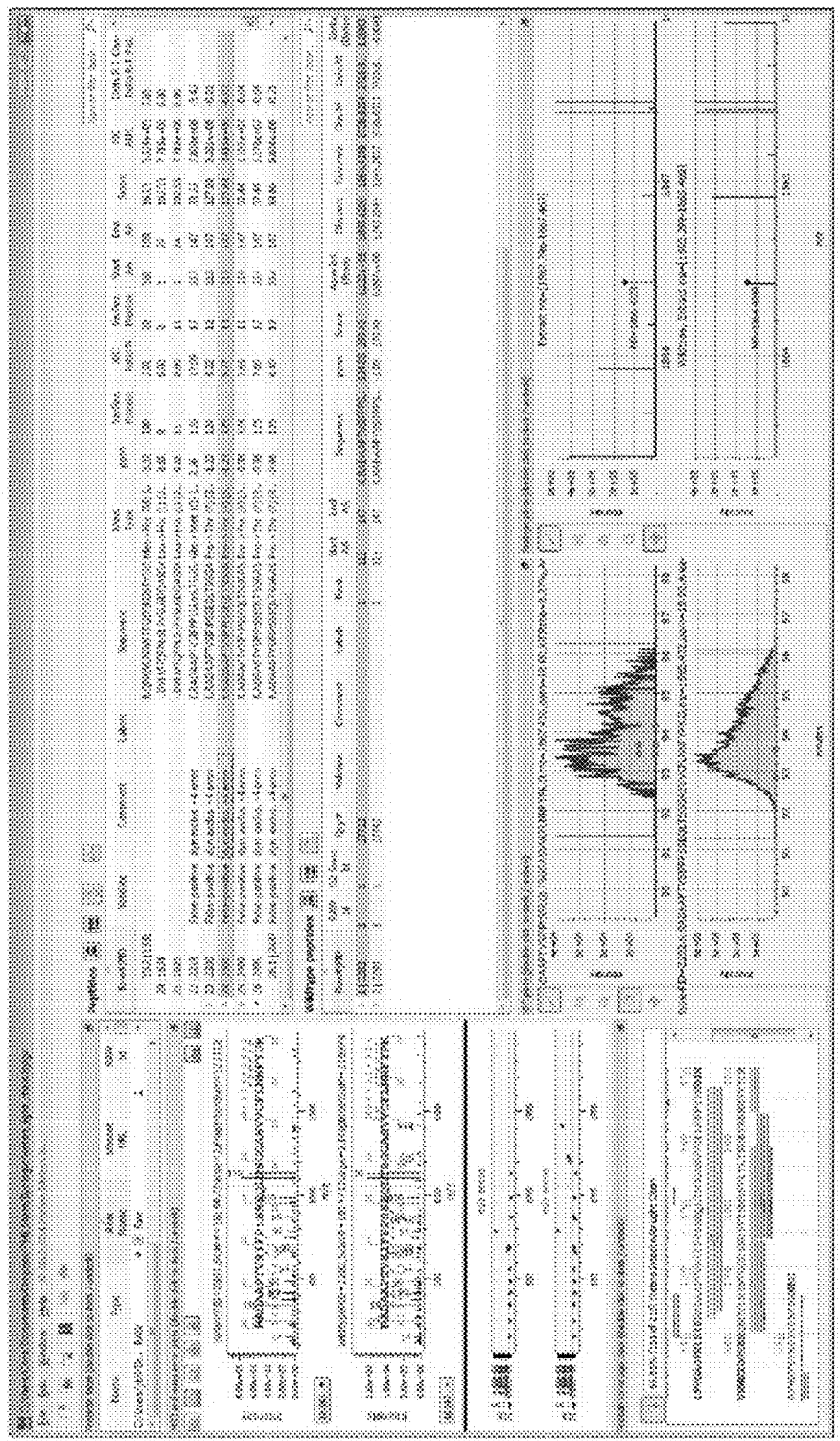

FIG. 1 provides a schematic diagram of the dashboard.
FIG. 2 provides a schematic diagram of the dashboard with four types of views.
FIG. 3 illustrates a typical dashboard.

Figure 4:
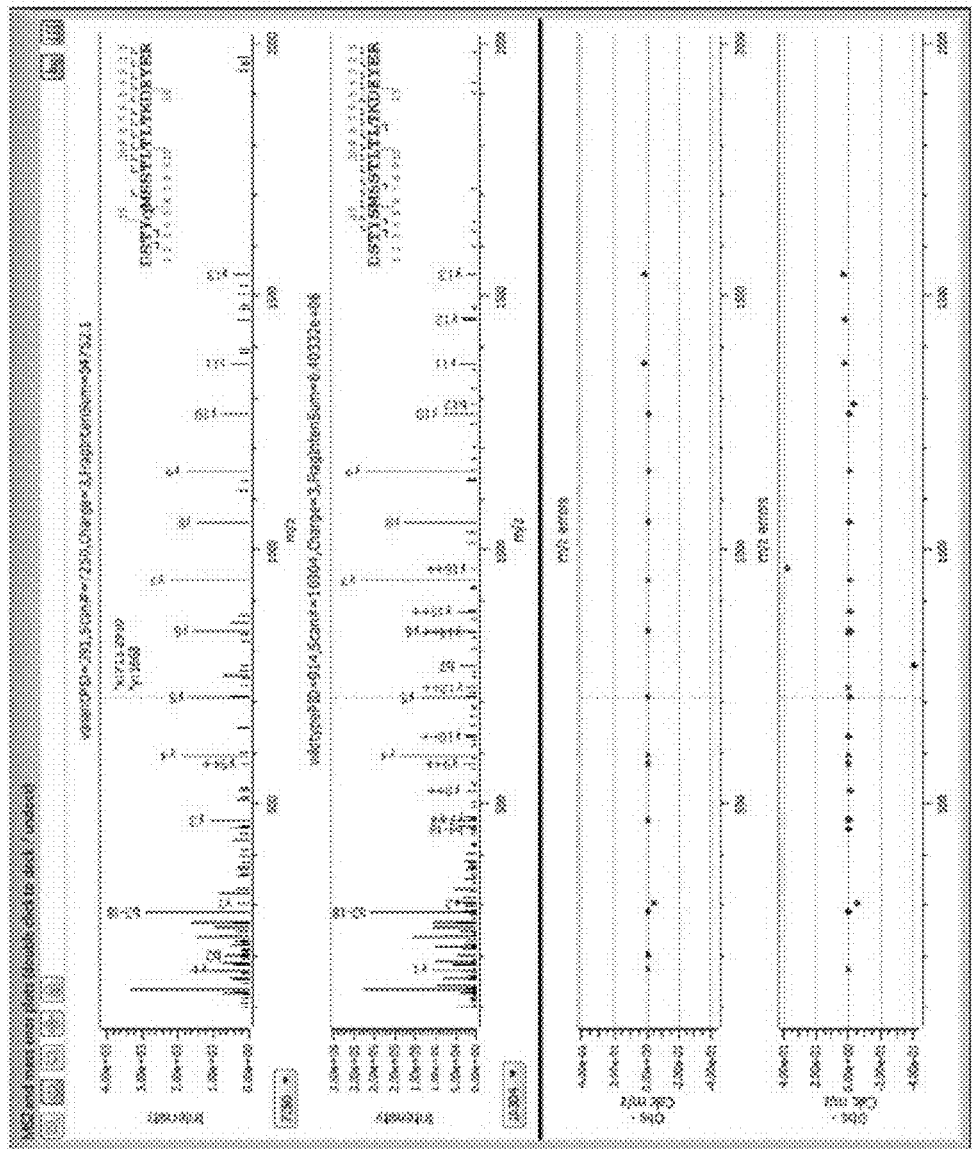

FIG. 4 provides one configuration of the MS2 spectral plot view. The top half shows a annotated MS2 spectra (variant on top, WT on bottom), and the bottom half shows the corresponding residual fragment m/z errors. When the cursor is placed over a peak, an asterisk appears with the exact mass-to-charge ratio (denoted m/z) and intensity displayed for that peak. Note the dotted line connecting the location of the mouse through all 4 plots.

Figure 5:
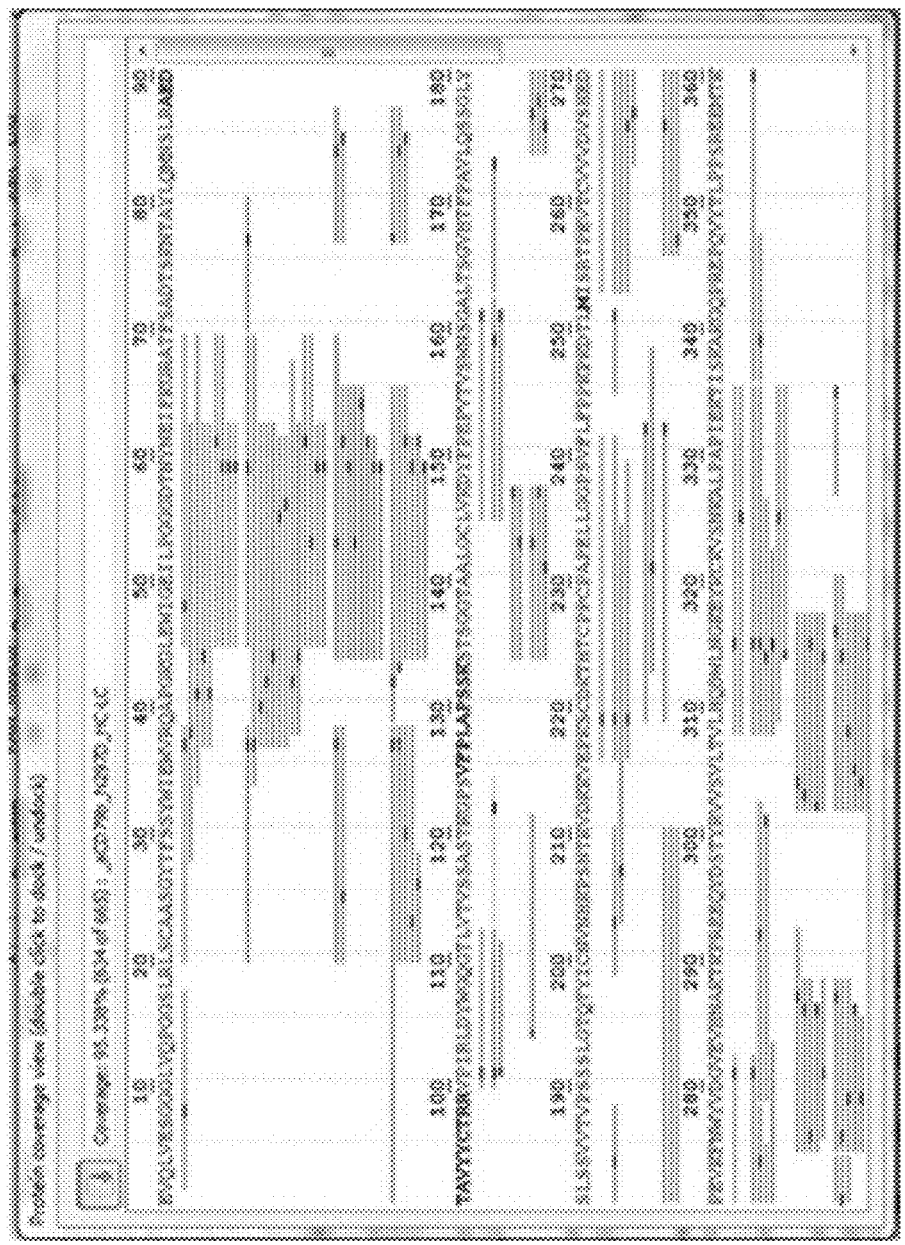
Figure 6:
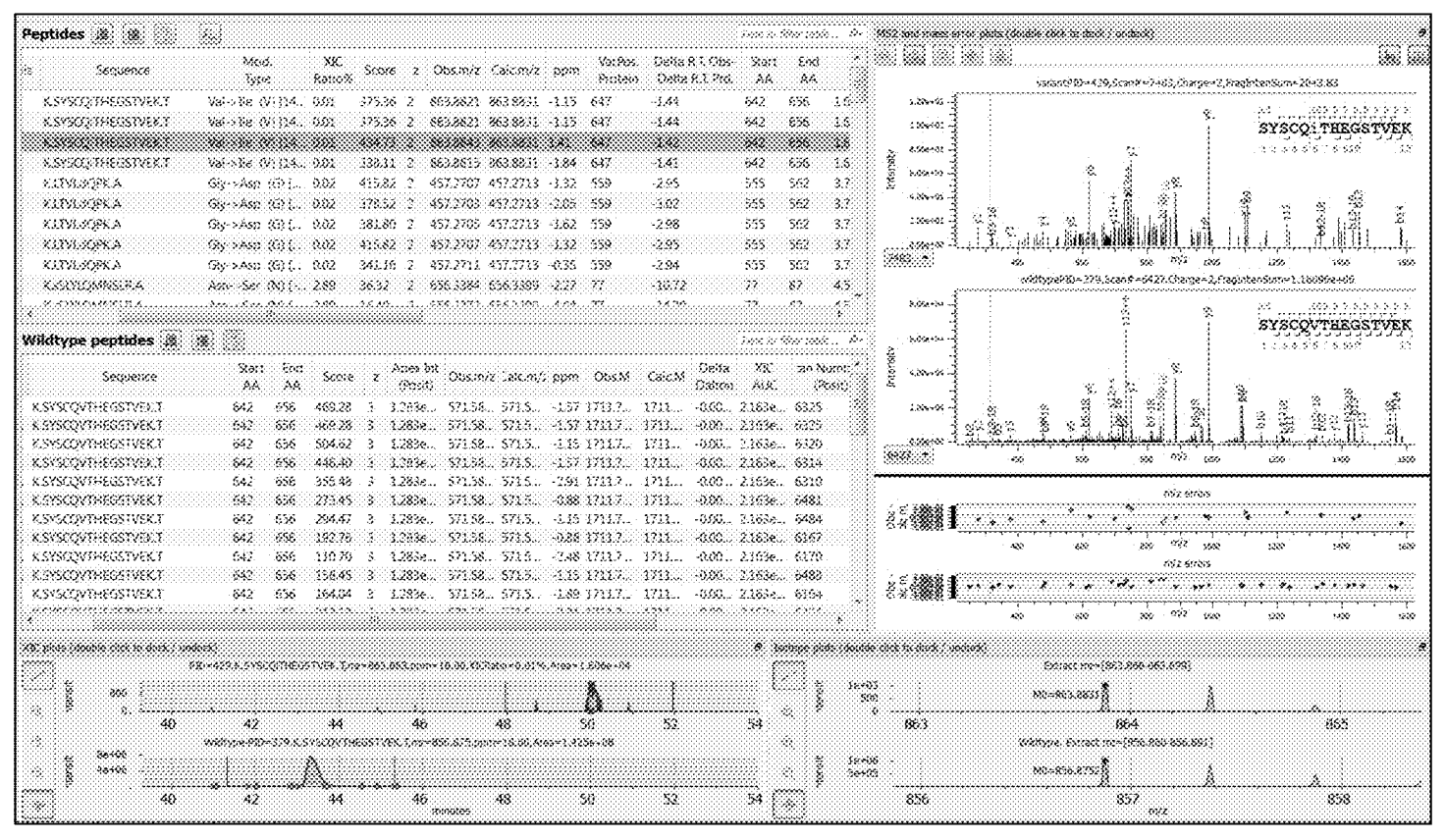

FIG. 5 provides one configuration of the Protein Coverage View, showing the sequence coverage of the putative identifications for the filtered variant/modification type(s). Variant positions within the peptides are highlighted. Results from different digestion enzymes are in different colors, and for a given digestion enzyme different LC-MS runs are separated by a space FIG. 6 illustrates the dashboard (showing MS2, MS1 and XIC spectra, and Variant Peptide View, Wildtype Peptide View), with a peptide having a putative Val→Ile substitution highlighted.

Figure 7:
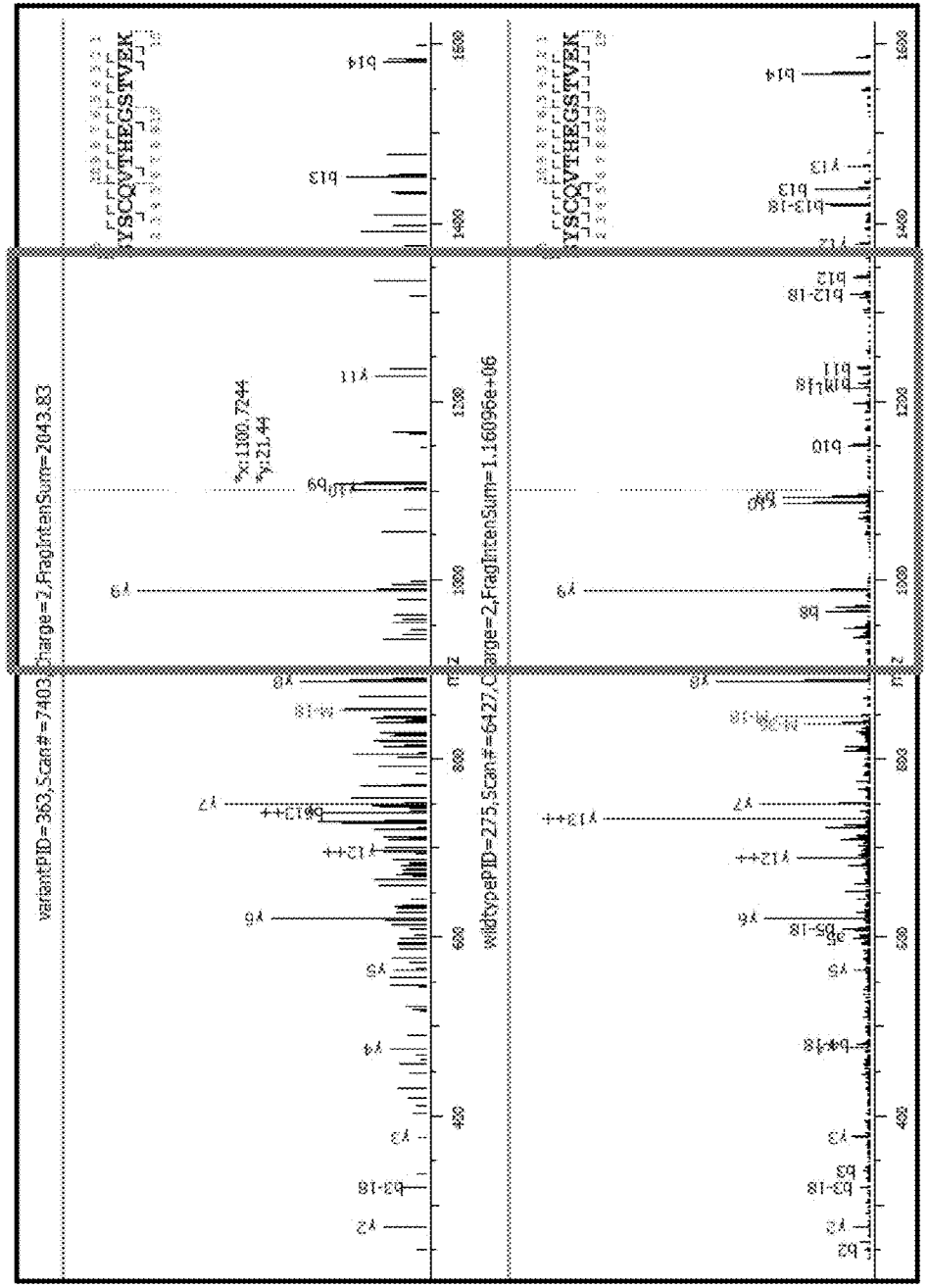

FIG. 7 provides an unzoomed view of an MS2 spectra for wild type and variant.

Figure 8:
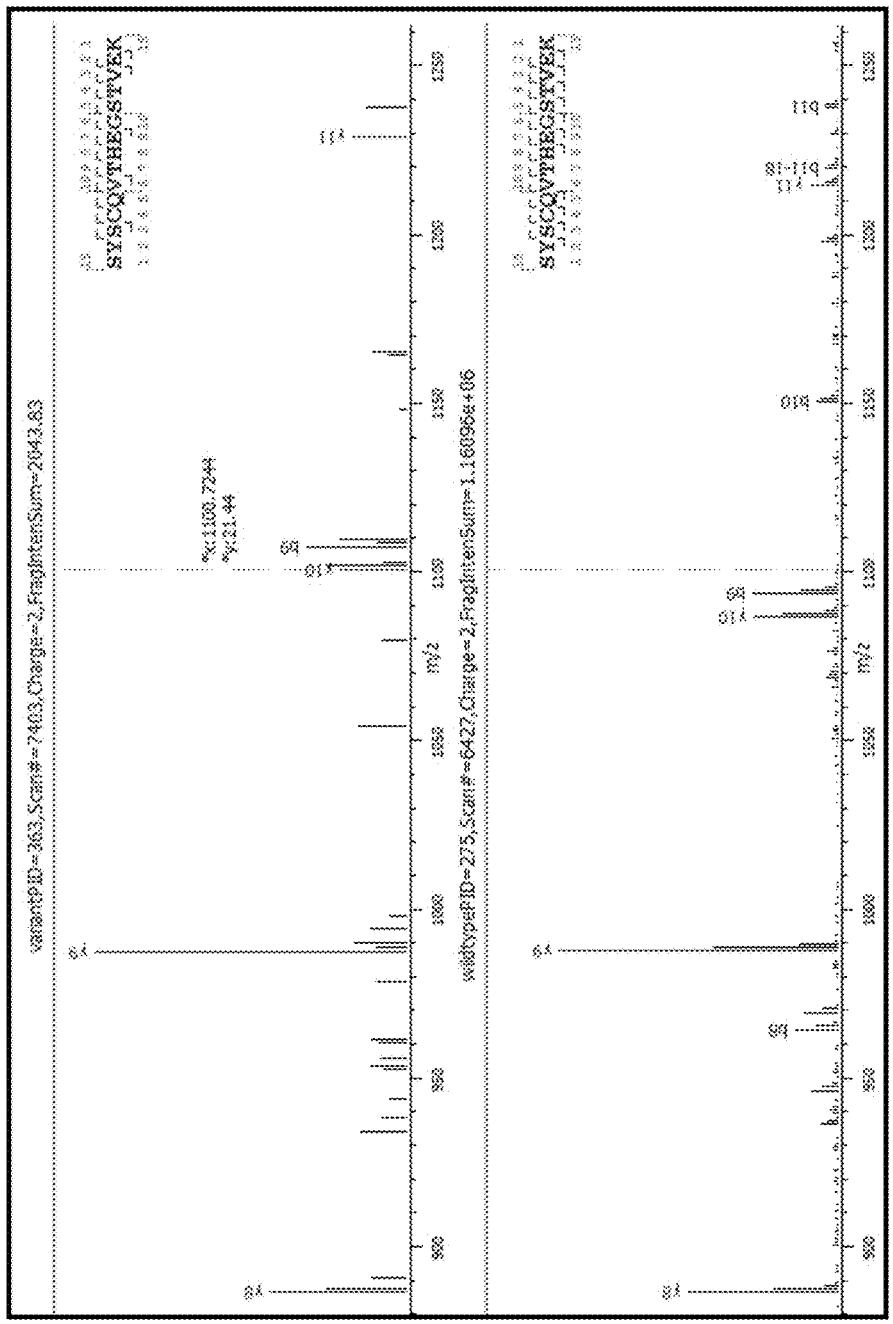

FIG. 8 zooms in on flanking peaks, which correspond to the boxed portion of the spectra in FIG. 8.

Figure 9:
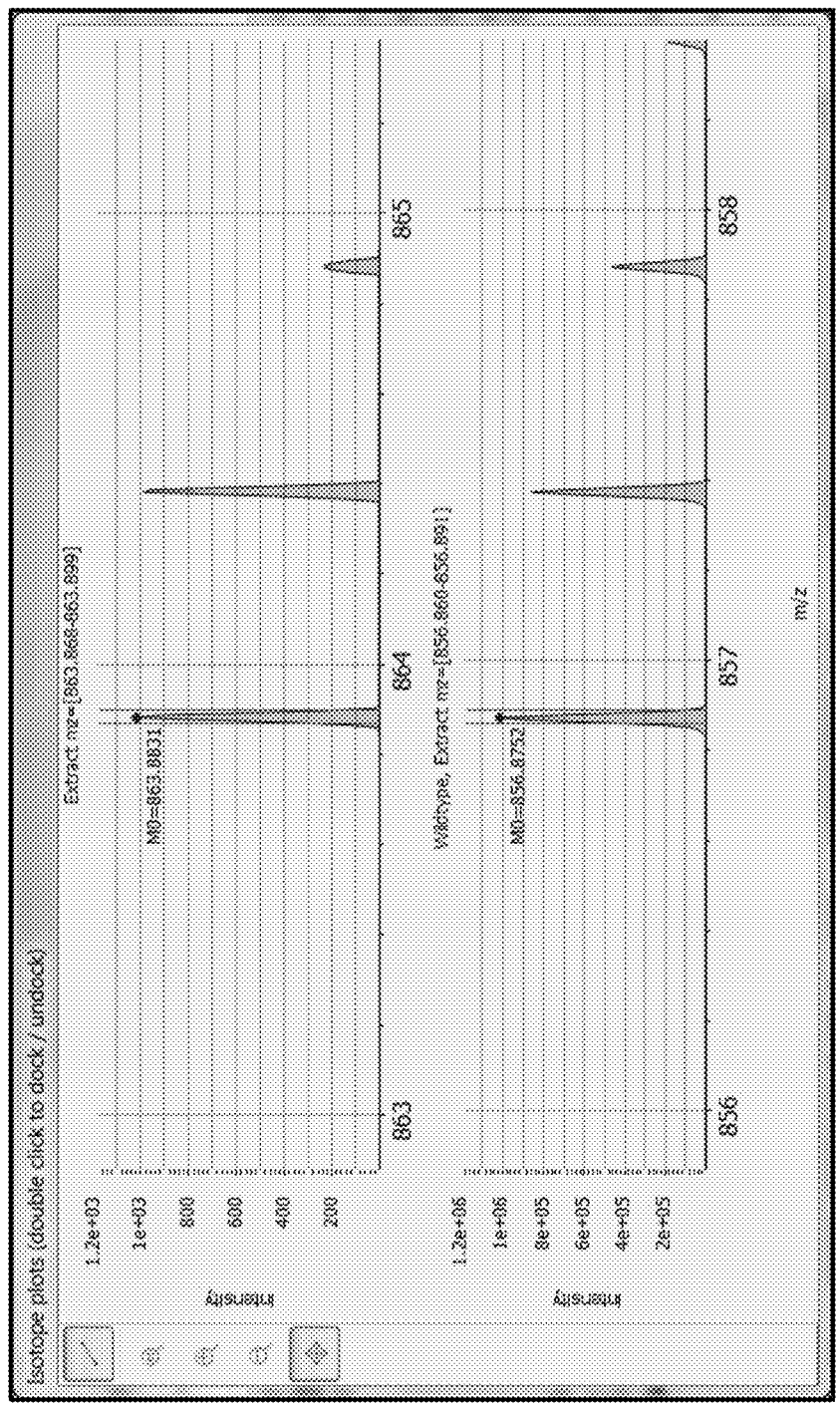

FIG. 9 provides an MS1 spectral plot view zoomed to a peak identified with a specific peptide.

VI. DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

A. Definitions

As used herein, "sequence variant" refers to any chemical change in a protein, peptide or peptide fragment relative to its wildtype counterpart. Sequence variants can include single or double amino acid substitutions, single amino acid insertions, single amino acid deletions, truncations, as well as oxidation, deamidation, glycosylation, and the like.

As used herein, the term "Mass Spectrometry" (MS) refers to a technique for measuring and analyzing molecules that involves ionizing or ionizing and fragmenting a target molecule, then analyzing the ions, based on their mass/charge ratios (m/z), to produce a mass spectrum that serves as a "molecular fingerprint". There are several commonly used methods to determine the mass to charge ratio of an ion, some measuring the interaction of the ion trajectory with electromagnetic waves, others measuring the time an ion takes to travel a given distance, or a combination of both.

As used herein, the term "sample" is used in its broadest sense, and may include a specimen or culture, of natural or synthetic origin.

As used herein, "protein" refers to a polymer of amino acids (whether or not naturally occurring) linked via peptide bonds. For the purposes of the present disclosure, a protein is the complete product, prior to any enzymatic digestion or fragmentation, that is to be subjected to analysis by mass spectrometry.

A "peptide," as used herein, refers to one or more members of the mixture produced by controlled digestion of a protein. Typically, the peptide mixture is a product of digestion of the protein with a proteolytic enzyme, however other methods of controlled digestion are contemplated. It is preferred that the digestion mechanism cleave the protein at positions in response to the presence of specific amino acids. Due to incomplete digestion by the enzyme or other mechanism, the mixture of digestion products (i.e. peptides) can include the undigested protein, which in this situation would also be a peptide.

Finally, as used herein the term "fragment" or "peptide fragment" refers to the products of fragmentation within an mass spectrometer.

B. Input Data

The invention described herein provides improved methods and systems for analyzing mass spectrometry data, especially to detect and identify molecular variants, wherein the initial sample contains a mixture of the molecule of interest (the reference molecule) and variant molecules, where the variants differ from the reference molecule by some chemical modification. The molecule of interest can be any molecule susceptible to analysis by mass spectroscopy, including but not limited to, polypeptides, oligonucleotides, lipids, organic polymers, pharmaceutical excipients and growth media components. A non-exclusive list of pharmaceutical excipients (polymers, surfactants, dispersants, solubilizers, bulking agents, etc.) includes, but is not limited to, polyvinylpyrrolidone, polyvinyl acetate, polysorbate, polyethylene glycol, polyvinyl alcohol, polyvinyl alcohol-polyethylene glycol, Poloxamer (polyethylene glycol-block-polypropylene glycol-block-polyethylene glycol), hydrogenate castor oils, and Mygliols. Cell growth media components include nutrients, such as protein, peptides, amino acids, and carbohydrates, as well as gelling components, such as agar, gelatin, carrageenans, alginates, and polyacrylamides. Exemplary modifications include oxidation, deoxidation, deamidation, conjugate, glycation, sulfation, glycosylation, alkylation, dealkylation, polymerization and the like. Preferably the methods and systems are useful for analyzing protein modifications, such as sequence substitutions, insertions or deletions, oxidation, deamination, glycosylation and the like.

The mass spectrometry data is acquired according to conventional methods, which typically consist of i) subjecting the sample to a separation technique, ii) acquiring an MS1 spectrum, iii) successively selecting each precursor ion observed with an intense signal on the MS1 spectrum, iv) successively fragmenting each precursor ion and acquiring its MS2 spectrum, v) interrogating databases through software (i.e. perform a computational search of observed spectra with respect to a database or a library of recorded spectra) to identify one or more molecules having a strong probability of matching the MS2 spectrum observed. In a preferred implementation, the sample is a protein that is first digested using a suitable enzyme to obtain a peptide mixture. Suitable enzymes include, but are not limited to trypsin, endoproteinase Asp-N, endoproteinase Glu-C, and thermolysin. If a protein sample contains wildtype protein and variant protein, the resulting peptide mixture will comprise wildtype peptide and variant peptide. Separation methods suitable for use in conjunction with the methods disclosed herein include, but are not limited to liquid chromatography (LC), gas chromatography, ion mobility, gel electrophoresis and capillary electrophoresis.

More than one type of digestion enzyme may be examined at once, and each may include multiple LC-MS/MS data acquisitions and multiple MS2 searches from any data acquisition. The MS2 data set may be generated using any fragmentation method, including any combination of low-energy CID, beam-type CID, and/or ETD. The quantification of a variant relative to wildtype (WT) is performed by label-free quantification with extracted ion chromatograms (XICs), which, in some implementations, have editable limits of integration.

Typically, the MS data is collected by a tandem mass spectrometer. In other implementations, the MS data is collected as MS1 data prior to fragmentation on a first mass spectrometer and MS2 data after fragmentation on a second mass spectrometer.

The data file(s) containing the MS1 and MS2 spectra can be loaded from a storage medium or received directly from another device (e.g. over a wired or wireless connection). The spectral data may be in any suitable format. In some implementations, the data is in a format proprietary to the manufacturer of the acquiring mass spectrometer, e.g. a .RAW file for a Thermo Fisher Scientific Orbitrap spectrometer. Alternatively, the data is stored or transferred in an open format, such as mzML. For implementations comparing variant and wildtype spectra, the wild type and variant data can be obtained from a single data file or from separate wildtype and variant data files.

The list of molecular identifications can be populated from results of a computational search of observed spectra with respect to a database or library of recorded spectra. Optionally, the system described herein will accept a file containing results of an MS2 search based upon the input MS data. The MS2 search can be performed by software such as Byonic, Mascot, SEQUEST, PEAKS DB, X!Tandem, and the like. Preferably, the search software is capable of identifying variants. For example, a very common search performed by the Mascot software, and that would be appropriate as input for the methods described herein, is the "Error-Tolerant Search". While the utility of the current versions of Sequest nor X!Tandem can be limited because these software packages allow any number of instances of each variant per peptide, these programs are appropriate when searches are limited to fewer than approximately 10 types of variants.

In addition to the spectral representations, the method and systems described herein require a description of the reference molecule. In the case of a protein, the description would be an amino acid sequence for the protein of interest in the sample. One or more chemical formulae, amino acid sequences, and/or oligonucleotide sequences can be entered manually, loaded from a storage medium or received directly from another device (e.g. over wired or wireless connection). In a preferred implementation, the structures and/or sequence(s) can be automatically loaded from a website, upon entry of a URL.

A. Dashboard

The graphical user interface (GUI) or "dashboard" comprises several interactive views. FIGS. 1 and 2 provides example schematic layouts for the dashboard applicable to protein samples. Several spectral representations compose the Spectral Plots V1, optionally including key numerical data. The second view, the Peptide View V2, which is tabular in nature, provides molecular peptide identifications (molecular identifications). The Protein Coverage View or Summary View V3 graphically shows the identified amino acid residues (AAs) in the amino acid sequence filtered on modification type. The Project View V4 shows the data files under study and their characteristics.

The user can rearrange the sizes and even positions of the views to make their own personal layout. In many implementations, the views are dockable; that is, users can detach the view, which can be especially useful when two or more computer monitors are available, and re-attach or rearrange views. In some implementations, each of the views has a bar at the top with the name of the view and, optionally, a message "double click to dock/undock." Custom layouts can be saved and loaded as small files represented by the suffix .ini (or other appropriate suffix in non-Windows operating systems) and can be shared between individuals.

A screen shot of a typical dashboard layout is seen in FIG. 3. The full dashboard shows spectral views (V1), peptide tables (V2), Protein Coverage (V3), and project view (V4). It is preferred that a common convention is defined for these views, e.g., where the a plot or table relating to the variant or modified form is displayed directly above that for the "wildtype" (reference) form when one exists. Such a convention makes visual comparison of corresponding data easy for the user. All figures in the present disclosure have adopted this convention, i.e., variant above reference (wildtype).

The dashboard allows the user to customize the viewed information in a variety of ways. In preferred implementation, the dashboard can simultaneously and interactively display an extracted mass chromatogram (XIC), an MS1 spectrum, and an MS2 spectrum based upon selection of a molecular identification by the user. In another preferred implementation the dashboard can simultaneously and interactively display paired spectra (XIC, MS1 and/or MS2) for a reference molecule and one or more variant molecules based upon a user selection of either a reference or variant molecule.

Preferably, the displayed spectra are selected from the group consisting of MS1 spectra, MS2 spectra and extracted ion chromatogram (XIC). When displaying paired spectra, preferably variant spectrum is displayed immediately above, immediately below or immediately beside the reference spectrum. Alternatively, the variant and wildtype spectra can be displayed sharing a single horizontal axis with the two traces being differentiated by color or line type (bold, dotted, etc.). When sharing the same axis, two spectra can also be differentiated by showing one representation above the x-axis and the second mirrored (or butterflied) below the x-axis.

1. Spectral Plot View

The spectral representations displayed on the dashboard comprise (a) precursor isotopic pattern (MS1 spectrum), and (b) associated MS2 spectrum. In a preferred implementation, the dashboard will display both MS1 and MS2 spectra for both variant and wildtype. Further, preferably, the MS2 spectra is annotated with associated fragment mass errors relative to the predicted values. In yet another implementation, the dashboard further comprises (c) mass-selected chromatograms (XICs, XIC plot) for both the variant and wildtype, if both forms are represented by MS1 and MS2 spectra. An XIC shows amount of peptide (typically measured as ion current within a selected m/z range) as a function of chromatographic elution time.

A variety of controls permit the user to manage the spectral plot views. In a preferred implementation, the times of MS2 scans on the m/z of the XIC are indicated by dots or other marks on the XIC plots. The MS2 scan currently active, meaning the one displayed in the MS2 plot (or wildtype or variant), is indicated by a different mark or color. In a preferred implementation, the three different types of plot (MS1, MS2, and XIC) allow panning, zooming, and resetting the level of zoom. The paired plots (e.g., MS2 of wildtype and variant) may be locked together so that the operations of panning, zooming, and resetting apply to both simultaneously.

MS1 Plot

An MS1 spectrum shows ion intensity as a function of mass-to-charge ratio (m/z) of unfragmented peptide ions. For accurate quantitation, MS1 scans should be acquired often enough that each peptide is sampled multiple times during its elution; one MS1 scan every two seconds is sufficient for most chromatography methods. FIG. 3 illustrates MS1 data in profile mode, meaning that the spectrum includes m/z measurements with regular spacing and shows peak shapes. The alternative is centroided data, meaning that each peak is replaced by its apex. The methods and systems described herein can be used in conjunction with either profile or centroided MS1 data.

Mass spectrometry instrument software (e.g., XCalibur from Thermo Fisher Scientific) labels each MS2 scan with the perceived m/z of the precursor ion. Conventionally the precursor m/z is the m/z of the monoisotopic molecule (meaning no $^{13}C$ atoms or other minority isotopes), but the instrument software makes errors by labeling the MS2 scan with the m/z of a higher isotope, and these errors can give false variant identifications. A preferred implementation marks the MS2 precursor m/z on the MS1 plot, so that a skilled operator or an error-detection software module can detect errors and reject false variant identifications.

An extracted ion chromatogram (XIC) as explained below can be used to measure quantity by integrating ion intensity over an m/z range and a time range. The integration may be over one or more isotope peaks of the ion. In a preferred implementation, the system uses the most intense isotope peak for the wildtype and the corresponding isotope peak for the variant. The limits of integration over m/z are shown on the MS1 spectrum plot by vertical lines or other marks. The limits are set automatically by the system but can be adjusted manually by a skilled operator in case the automatically set limits do not capture the full peak or capture more peaks from two different ion species.

MS2 Plot

The MS2 spectral plots for the for variant and reference molecules are another important feature of the software system. In a preferred implementation, the peaks in these plots are annotated with the product ions (fragments such as b- and y-ions) with calculated m/z values matching the observed m/z values of the peaks. In addition, this plot can include the m/z errors for each fragment peak relative to its predicted m/z value (FIG. 4). A skilled operator can compare reference and variant MS2 spectra and thereby validate true variants and reject false positives. For example, for an amino acid substitution, only those product ions (such as b- or y-ions) ions containing the misincorporation will show a mass shift, and they should all show the same expected mass shift. A feature that aids comparison of aligned MS2 spectra is a cursor that is movable by the mouse (or other user interface device) and allows alignment of the different b/y (c/z) ions with a dotted line. In some implementations, when the cursor is positioned exactly over a fragment ion, the exact reported m/z and intensity is shown with an asterisk as seen in FIG. 4.

The mass errors should be similar for both MS2 spectra as well; otherwise misidentification is likely. It should be remembered however, that the variant molecule may be at low concentration and hence measured at lower signal-to-noise ratio and this may cause missing fragment ions or larger m/z errors.

In one implementation, the MS2 plots additionally display the amino acid sequence with b/y (c/z) ions mapped in the upper right to quickly show which fragment ions are observed. Preferably, the system will include label and fragment buttons capable of turning on/off these annotations.

Extracted Mass Chromatograms (XIC)

In some implementations, the dashboard will also provide an extracted mass chromatogram (also known as an extracted ion chromatogram or "XIC"). There are various aspects to the XIC of a molecule that can help in distinguishing a true from false identification, or whether a variant identification is of sufficient abundance to be relevant. The XIC plot shows the intensity versus chromatography time for the variant (top) and reference (bottom) molecules and their areas in ion counts. When the methods and systems are used in conjunction with both variant and reference spectral representations it is preferred that the XIC plot shows a ratio of XIC areas for variant/reference at the top of the XIC plot. In some implementations, this ratio also is displayed in a data column in the Peptide View (molecule identification table).

Automatic setting of the time window for XIC integration can be made during project creation and those default time limits are visible as two vertical lines for each XIC. These lines can be dragged by the user's mouse to adjust the integration time for individual XICs if needed. The indicators marking the integration time limits are preferably two vertical lines, however other indicators, such as arrows or other marks, can also be used.

Variant and reference molecule elution times are important information for deciding the correctness of a variant identification. An unexpected difference between these elution times can be a sign of an incorrect variant identification. In a preferred implementation, the system predicts elution time shift of the putative variant relative to the reference based upon the chemical structure of the variant and reference molecules. In one implementation, elution time prediction for peptides can be based on the algorithm of Krokhin et al. (Mol. Cell. Proteomics, vol. 3, 908-919 (2004); PMID 15238601, incorporated herein by reference). The molecular identification table (as Peptide View), described in greater detail below, can include columns for observed and predicted elution times of the variant and reference molecules, but the column of the DeltaObserved-DeltaPredicted, that is, the difference of the two differences; is of most importance because this "Delta-delta" tends to minimize the effect of absolute prediction time errors and is a more stable statistic to use as evidence for an incorrect identification due to improbable elution times.

2. Peptide View

The molecular identifications can be provided in tabular form. In one implementation a list of peptide identifications in tabular form (the Peptide View), wherein each line of the tabular form represents a single peptide from the list. User selection of a molecular identification from the list can automatically display the XIC, MS1 spectrum and/or MS2 spectrum associated with the molecule. Preferably, selection of a molecule from the list will also automatically display spectra associated with corresponding molecules (reference or variant). The molecular identification table can be populated from results of a computational search of observed spectra with respect to a chemical database (e.g. a sequence database for peptides) or library of recorded spectra.

In some implementations, the molecular identifications can be split into two tables, a reference molecule table and variant molecule table. Such an implementation can be particularly useful when analyzing protein variants based on mass spectra collected for an enzymatic digest of a protein preparation of interest. The Variant View provides information on the variant peptide identifications. The Wildtype Peptide View shows the wildtype identifications corresponding to a variant/modification identification. In some implementations, the peptide table is a table of "peptide-spectrum matches (PSMs)", in which peptide identifications are replicated with each peptide associated with a single scan. In another implementation, the peptide in the peptide table is matched to the highest-scoring scan. In this implementation, the peptide can be matched with all scans having a peak corresponding to the peptide sequence (and associated modifications) and optionally the user could drill down to see all scans.

In some implementations, a listed PSM is associated to an MS2 spectrum. A listed peptide is associated to a set of, more or less identical, MS2 spectra. The listed PSM is associated to a peak in an MS1 spectrum that triggered the MS2. This MS1 peak can appear in multiple MS1 scans. By selecting an MS1 peak over multiple scans, and presenting it as a function of time, one generates the XIC. Therefore, by associating the peptide with one or more MS2 spectra, the corresponding MS1 and XIC are also associated.

The data fields, their (customizable) organization, and associated plots are intended to provide the user with the information needed to efficiently make a validation decision and associated annotation for each of the putative variant identifications in the Variant View. There are various strategies and techniques to determine the proper validation status of each of the peptide entries, and these can be refined with experience, and of course depend on the case.

The tabular form can comprises a variety of data fields, for example, a field providing the modification state of each molecule or a field providing a validation status of each peptide identification. Examples of suitable modification states include, but are not limited to, unmodified (wildtype), amino acid substitution, amino acid insertion, amino acid deletion, oxidation, deamidation, and glycosylation. Examples of suitable validation statuses include, but are not limited to true-positive, false-positive and uncertain. In other implementations, the assembly of peptide identifications is a graphical representation of the protein, wherein the graphical representation of the protein comprises an amino acid sequence for the protein and a plurality of markers mapped to the amino acid sequence and representing peptides within the protein, and further wherein the step of selecting a peptide comprises user selection of a marker.

For Variant View and Wildtype Peptide View, the user can also rearrange and sort columns as well as hide/show columns and adjust their widths for optimum viewing. In an exemplary implementation, this can be done by dragging column headers or right clicking on the heading to pop-up a Header Editor. Alternatively or additionally, a user can rearrange columns by dragging around the row positions, and show or hide specific columns. In a preferred implementation, the Header Editor tool tips are available by hovering the mouse over column headings and icons.

Peptide, or oligonucleotide, entries optionally may be grouped by sequence. In one implementation, this function can be accessed via a "Group By" command on the Menu bar. In Variant Peptide view, for multiple peptides to be grouped together, their identifications must have the same sequence including modification type and position. In Wildtype Peptide View, the wildtype peptides are grouped only if they have the same sequence, observed charge (z), and Raw file ID # (same LC-MS/MS run). In some implementations, above the tabular views, there can be buttons with down (ungroup) and up (group) arrows which cause the display to show or not show multiple occurrences of a given sequence.

The principal action of the user, after examination of the relevant data, is to apply to each putative variant molecule identification a Validation class. In a preferred implementation, the possible options are presented to the user via a drop down menu in a Validate column in the molecular identification table. In one implementation, the choices are True-positive, False-positive, and Uncertain. These values can be changed by the user, so for example Uncertain might be chosen while study continues.

In some implementations, the user can also enter written Comments in a field accepting free text. The Comment field can be edited by typing directly into the Comment cell of the Peptide View table or by double-clicking on the cell to open a pop-up box for typing.

The Variant View and Wildtype Peptide View tables can each be filtered, for example using a text box on the upper right hand side of that view. For example, to find all peptides containing a certain amino acid sequence, one can simply filter for peptides containing a specified string of letters. Or if a particular m/z is of interest, one can simply type a number representing that m/z.

In some cases, filters based on characteristics of the putatively identified peptide via MS2 data can be applied. For example, a minimum matching score such as a Mascot Ions score of at least 30, can be chosen. In another implementation, specific to analyses using Mascot search results, a filter based on Minimum alt_rank_score/primary_rank_score can be used. Maximum m/z errors can be used. Often an initial search will include a maximum m/z error, but this secondary filter provides an opportunity to further shrink the acceptable error, if desired. A maximum retention time deviation relative to the wildtype (minutes) can be entered; a large number means the user wishes no filtering of the input data on that basis, although one may still use that information in judging whether the identification is a false or true positive. A minimum XIC ratio (variant/modified form relative to the wildtype) can be set, to for example 1%, 0.2%, or 0% (no filter). A minimum modification mass shift may be set; for example, setting to 2 will filter out deamidations.

A filter can also be based upon data type associated with each molecule within the table. For example, molecular identifications can be assigned a validation class, such as true-positive, false-positive, uncertain or unassigned, Molecular identifications can also be assigned a modification class. The modification class can specify an amino acid substitution, e.g. Leu→His, or a chemical modification, such as oxidation or deamidation. When applying a peptide type filer, the results can be filtered by a specific class, e.g. oxidation, or by a group of classes, e.g. any amino acid substitution (such as Leu→His or Pro→Thr). In other implementations, the filter can perform a string search on the modification class. For example, one can filter on the search string "oxidation" and select peptides having oxidation or dioxidation as the modification class. Preferably, filter settings can be saved and reloaded for convenience.

3. Protein Coverage View

The Protein Coverage View is a graphical representation of a protein of interest. For example, the graphical representation of the protein can comprise an amino acid sequence for the protein and a plurality of markers mapped to the amino acid sequence and representing peptides within the protein, and further wherein user selection of a marker automatically displays the XIC, MS1 spectrum and MS2 spectrum associated with the peptide represented by the marker. The peptide mapped to the amino acid sequence can be modified relative to the amino acid sequence, and the modification would be graphically depicted on the marker for the peptide. A similar graphical view is contemplated for other polymeric molecules, e.g. for an oligonucleotide, wherein the amino acid sequence is replace with a nucleotide sequence.

FIG. 5 shows an example of a Protein Coverage View. This exemplary Protein Coverage view shows the sequence coverage of putative peptide identifications. The positions of variants (sequence modification, oxidation, and the like) are highlighted, typically with a contrasting color. In situations where MS data from more than one enzyme digestion is input, the Protein Coverage view will visually distinguish between digestion patterns, typically using distinct colors but may also distinguish by pattern, depth of color and the like.

In FIG. 5, results from two different digestion enzymes: thermolysin (blue bars) and trypsin (red bars) are illustrated. Variant locations are also indicated by the highlighted AA positions in the bars. Clicking on a bar selects a peptide identification in either the Variant Peptide View or the Wildtype Peptide View and changes the MS1 and MS2 plots accordingly; conversely, clicking on a listing in one of the Peptide Views changes the highlighted bar and the MS1 and MS2 plots. As with other views described herein, the Protein Coverage View can be undocked from the contiguous dashboard and be moved to cover some part of the rest of the GUI or dragged to a second computer monitor.

In the Protein Coverage view, peptide identification entries optionally may be grouped by sequence. This function can be accessed via a "Group By" command on the Menu bar. In the Protein Coverage View, grouping is based on the same sequence, modification type and position, and Raw ID #.

4. Project View

Finally, the dashboard can comprise a Project View, which provides the user with information relating to source files, export files, and user preference files. Preferably, the Project View identifies the source files in a tabular format. The fields of the tabular format include, but are not limited to, one or more of the following: file name, file type, source URL, Raw ID#, type of preprocessing (e.g., digestion with trypsin or thermolysin), type of search (e.g., fully tryptic or semi-tryptic), search engine (e.g., Mascot or Byonic), and so forth. The user can rearrange and sort columns as well as hide/show columns and adjust their widths for optimum viewing. This can be done by dragging column headers or right clicking on the heading to pop-up a Header Editor. The user can rearrange columns by dragging around the row positions, and show or hide specific columns.

As mentioned above, selecting a peptide identification bar in the Protein Coverage View also makes a selection in the Peptide View, and vice versa. Selecting a variant peptide, either as a bar in the Protein Coverage View or as a listing in the Variant Peptide View, automatically populates the Wildtype Peptide View. Selection of a peptide, variant or wildtype, either as a bar of a listing, automatically populates the XIC plots. Zooming or panning within the variant spectrum plot can be optionally linked with the same actions in the wildtype spectrum plot, and vice versa.

In some implementations, a table within the dashboard will include an Export data button with a spreadsheet icon which enables exporting of a file, preferably a delimited text-based file. A delimited text-based file is any type of text-based file that establishes delimiters between a series of data, such as spreadsheet files, comma-separated value (CSV) text files, tabular text files, and the like. It should be noted that a text-based file can be either a text file or binary file that represents delimited text, such as some spreadsheet files. The export data button can be associated with any tabular view, but most preferably is associated with a Peptide View table. Clicking on the Export data button typically will open a dialog box allowing some choices for the exported table. For example, clicking on the " . . . " button will allow the user to browse to the desired save location and also allow file naming. This is a useful function for making reports and sharing data. The exported table will have the columns and their orderings as in currently active table and thus provides a flexible and customizable table to export.

The spectral plots may be exported as image files for assisting in report generation. In one implementation, the user can right-click from within the plot area to see an "export image" function which if clicked will open a dialog box. From this box the user can change a variety of parameters, such as x,y ranges, aspect ratio and figure overall size, as well as save the image in .pdf, ps. or .png formats. The plot may be zoomed-in as desired.

Alternatively, results can be exported via a pull down command under File on the Menu bar of the dashboard. Depending upon the active view at the time of exportation, the file format can be a text, HTML, spreadsheet, tabular, or image file. For example, peptide tables can be exported in .html or .csv format. Spectral data is preferably exported as image files, such as .png, .ps or .pdf formats.

The subject matter described herein for visual analysis of mass spectrometry data may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a non-transitory tangible computer readable medium.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

Reporting of the results of the analyses may be performed in numerous alternative ways-for instance via a visual display terminal, a paper printout, or, indirectly, by outputting the parameter information to a database on a storage medium for later retrieval by a user or by a combination of these reporting methods. The reporting step may include reporting either textual or graphical information, or both.

VII. EXAMPLES

A. Example 1

A controlled mixture of two human monoclonal antibodies (designated mAb1 and mAb2), was prepared with mAb2 at 1%. The controlled mixture was used as the sample for a 3-hour LC-MS/MS run on Thermo Orbitrap Elite to generate, Orbitrap MS1, CID fragmentation, ion-trap MS2. Several MS2 searches were performed utilizing Byonic (Protein Metrics, Belmont, Calif., USA), including searches for the most common amino acid substitutions at most one per peptide, any amino acid substitution at most one per peptide, combinations of substitutions and modifications, and a wild card search (any mass delta within +/−210 Da).

Valine to isoleucine or leucine is a common substitution. FIG. 6 illustrates the dashboard (showing MS2, MS1 and XIC spectra, and Variant Peptide View, Wildtype Peptide View), with a peptide having a putative Val substitution highlighted. FIG. 7 provides an unzoomed view of the MS2 spectra for wild type and variant. FIG. 8 zooms in on flanking peaks to localize a +14.016 mass delta. The y10 (and greater) peak was shifted, while the y9 (and lower) peak was not. After identifying the putative variant, the MS1 isoptopic plot is (FIG. 9) was consulted to confirm that the monoisotopic mass corresponded to the putative variant. Finally, the XIC plot was used to confirm the putative identification and quantify the amount of variant.

Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

We claim:

1. A non-transitory machine-readable medium that stores instructions, which, when performed by a machine, cause the machine to perform operations comprising:
receiving a data file comprising mass spectrometry (MS) data for a sample comprising a mixture of molecules comprising a reference molecule and one or more variant molecules, wherein each variant molecule has a chemical modification relative to the reference molecule, and wherein the MS data comprises a plurality of spectral representations;
providing an assembly of molecular identifications, wherein each molecular identification correlates a spectral representation with the reference molecule and a modification state, wherein the modification state describes the chemical modification for a variant molecule relative to the reference molecule and wherein the modification state is null for the reference molecule;
selecting a molecular identification based on user-input; and
simultaneously and interactively displaying a first arrangement of a plurality of spectral representations, wherein a first spectral representation of the first arrangement is correlated to the selected molecular identification and a second spectral representation of the first arrangement is correlated to a first molecular identification having the same reference molecule but different modification state;
wherein a user selection or modification in the first spectral representation is automatically made in the second spectral representation and a user selection or modification in the second spectral representation is automatically made in the first spectral representation.

2. The non-transitory machine-readable medium of claim 1, wherein the reference molecule is a protein.

3. The non-transitory machine-readable medium of claim 1, wherein the reference molecule is one peptide from a plurality of peptides that are a product of enzymatic digestion of a protein.

4. The non-transitory machine-readable medium of claim 3, wherein the assembly of molecular identifications is a graphical representation of the protein, wherein the graphical representation of the protein comprises an amino acid sequence for the protein and a plurality of markers mapped to the amino acid sequence and representing the plurality of peptides, and further wherein the step of selecting a molecular identification comprises user selection of a marker in the graphical representation.

5. The non-transitory machine-readable medium of claim 3, wherein the modification state of the selected molecular identification is a sequence variant and the modification state of the first molecular identification is null.

6. The non-transitory machine-readable medium of claim 1, wherein the assembly of molecular identifications is presented in tabular form, wherein each line of the tabular form represents the reference molecule or a single variant molecule, and wherein the step of selecting a molecular identification comprises selecting a line of the tabular form.

7. The non-transitory machine-readable medium of claim 6, wherein the assembly of molecular identifications is populated from results of a computational search of observed spectra with respect to a molecular database or library of recorded spectra.

8. The non-transitory machine-readable medium of claim 1, wherein the modification state is selected from the group consisting of unmodified, sequence variant, insertion, deletion, extension, oxidation, deamidation, conjugate, glycation, sulfation, and glycosylation.

9. The non-transitory machine-readable medium of claim 1, wherein the plurality of spectral representations of the first arrangement are selected from the group consisting of a first stage of mass spectrometry (MS1) spectra, a second stage of mass spectrometry (MS2) spectra and extracted ion chromatograms (XIC).

10. The non-transitory machine-readable medium of claim 1, wherein a third spectral representation of the first arrangement is correlated to a second molecular identification having the same reference molecule as the selected and first molecular identifications but a different modification state from both the selected and first molecular identifications.

11. The non-transitory machine-readable medium of claim 1, wherein the operations further comprise:
simultaneously displaying a second arrangement of a plurality of spectral representations, wherein a first spectral representation of the second arrangement is correlated to the selected molecular identification and a second spectral representation of the second arrangement is correlated to the first molecular identification.

12. The non-transitory machine-readable medium of claim 11, wherein the spectral representations of the first arrangement are a first stage of mass spectrometry (MS1) spectra, and the spectral representations of the second arrangement are a second stage of mass spectrometry (MS2) spectra.

13. The non-transitory machine-readable medium of claim 11, wherein the spectral representations of the first arrangement are a first stage of mass spectrometry (MS1) spectra, and the spectral representations of the second arrangement are extracted ion chromatograms (XIC).

14. The non-transitory machine-readable medium of claim 11, wherein the spectral representations of the first arrangement are a second stage of mass spectrometry (MS2) spectra, and the spectral representations of the second arrangement are extracted ion chromatograms (XIC).

15. The non-transitory machine-readable medium of claim 1, wherein the first spectral representation is displayed immediately above, immediately below or immediately beside the second spectral representation.

16. The non-transitory machine-readable medium of claim 1, wherein the first spectral representation and second spectral representation are displayed sharing a single horizontal axis.

17. The non-transitory machine-readable medium of claim 1, wherein the reference molecule is selected from the group consisting of polypeptides, oligonucleotides, lipids, and organic polymers.

18. A method for displaying mass spectrometry data comprising:
receiving a data file comprising mass spectrometry (MS) data for a sample comprising a mixture a reference molecule and one or more variant molecules, wherein each variant molecule has a chemical modification relative to the reference molecule, and wherein the MS data comprises a plurality of spectral representations;
providing an assembly of molecular identifications, wherein each molecular identification correlates a spectral representation with the reference molecule and a modification state, wherein the modification state describes the chemical modification for a variant molecule relative to the reference molecule and wherein the modification state is null for the reference molecule;
selecting a molecular identification based on user-input; and
simultaneously and interactively displaying a first arrangement of a plurality of spectral representations, wherein a first spectral representation of the first arrangement is correlated to the selected molecular identification and a second spectral representation of the first arrangement is correlated to a first molecular identification having the same reference molecule but different modification state,
wherein a user selection or modification in the first spectral representation is automatically, made in the second spectral representation and a user selection or modification in the second spectral representation is automatically made in the first spectral representation.

19. A non-transitory machine-readable medium that stores instructions, which, when performed by a machine, cause the machine to perform operations comprising:
receiving a data file comprising mass spectrometry (MS) data for a sample comprising a mixture a reference molecule and one or more variant molecules, wherein each variant molecule has a chemical modification relative to the reference molecule, and wherein the MS data comprises a plurality of spectral representations;
providing an assembly of molecular identifications, wherein each molecular identification correlates a plurality of spectral representations with the reference molecule and a modification state, wherein the plurality of spectral representations comprise an extracted ion chromatogram (XIC), a first stage of mass spectrometry (MS1) spectrum and a second stage of mass spectrometry (MS2) spectrum, and wherein the modification state describes the chemical modification for a variant molecule relative to the reference molecule and wherein the modification state is null for the reference molecule;
selecting a molecular identification based on user-input; and
simultaneously and interactively displaying an arrangement of a plurality of views in a graphical user interface, wherein said plurality of views comprises:

a first XIC correlated to the selected peptide immediately adjacent to a second XIC correlated to a first molecular identification having the same reference molecule as the selected peptide but different modification state;

a first MS1 correlated to the selected peptide immediately adjacent to a second MS1 correlated to a first molecular identification having the same reference molecule as the selected peptide but different modification state; and a first MS2 correlated to the selected peptide immediately adjacent to a second MS2 correlated to a first molecular identification having the same reference molecule as the selected peptide but different modification state, wherein a user selection or modification in any of the views is automatically made in the all of the views.

20. A non-transitory machine-readable medium that stores instructions, which, when performed by a machine, cause the machine to perform operations comprising:

receiving a data file comprising mass spectrometry (MS) data for a sample comprising a peptide mixture of a protein, wherein the MS data comprise spectra collected across a time range for the sample prior to and after fragmentation;

simultaneously and interactively displaying a layout of a plurality of views in a graphical user interface, wherein said plurality of views comprises:

an extracted mass chromatogram (XIC) based on the data file showing a measure of peptide as a function of time, the chromatogram comprising a plurality of XIC peaks, wherein each peak is associated with one or more peptides, each of which is associated with a plurality of first stage of mass spectrometry (MS1) and second stage of mass spectrometry (MS2) spectra;

an MS1 spectrum based on data collected for the sample prior to fragmentation, wherein the spectrum comprises a plurality of MS1 peaks, wherein one or more peaks are each associated with a corresponding MS2 spectrum; and an MS2 spectrum based on data collected for the sample after fragmentation, wherein the spectrum corresponds to a peak in the displayed MS1; and controlling the arrangement of the plurality of views with an user-interactive selector;

wherein a single user action comprising selecting a peptide in any of the views is automatically and simultaneously made in the all of the views comprising updating the plurality of views to display the XIC, MS1 spectrum and MS2 spectrum associated with the selected peptide.

* * * * *

UNITED STATES PATENT AND TRADEMARK OFFICE
CERTIFICATE OF CORRECTION

PATENT NO. : 9,640,376 B1  
APPLICATION NO. : 14/306020  
DATED : May 2, 2017  
INVENTOR(S) : Becker et al.

Page 1 of 1

It is certified that error appears in the above-identified patent and that said Letters Patent is hereby corrected as shown below:

In the Specification

Column 18, Line 7; after "having a putative", delete "Val substitution" and insert --Val→Ile substitution--.

Signed and Sealed this  
Third Day of July, 2018

Andrei Iancu  
*Director of the United States Patent and Trademark Office*